(12) United States Patent
Danielian et al.

(10) Patent No.: US 9,698,500 B2
(45) Date of Patent: Jul. 4, 2017

(54) JOINT SLEEVE FOR HIGH TEMPERATURE INSULATED BUS PIPES

(71) Applicants: Nikolai Danielian, Kerpen (DE); Fatima Ferkhatovna Yashina, Moscow (RU); Gagik Gamletovich Galstyan, Pavlovskiy Posad (RU)

(72) Inventors: Nikolai Danielian, Kerpen (DE); Fatima Ferkhatovna Yashina, Moscow (RU); Gagik Gamletovich Galstyan, Pavlovskiy Posad (RU)

(73) Assignees: Nikolai Danielian, Kerpen (DE); Fatima F. Yashina, Moscow (RU)

( * ) Notice: Subject to any disclaimer, the term of this patent is extended or adjusted under 35 U.S.C. 154(b) by 0 days.

(21) Appl. No.: 15/235,424

(22) Filed: Aug. 12, 2016

(65) Prior Publication Data
US 2017/0047722 A1 Feb. 16, 2017

(30) Foreign Application Priority Data
Aug. 13, 2015 (RU) .............................. 2015133962

(51) Int. Cl.
| | | |
|---|---|---|
| H02G 15/02 | (2006.01) | |
| H01R 4/70 | (2006.01) | |
| H01R 4/64 | (2006.01) | |
| H02G 5/00 | (2006.01) | |

(52) U.S. Cl.
CPC ............... H01R 4/70 (2013.01); H01R 4/643 (2013.01); H02G 5/007 (2013.01)

(58) Field of Classification Search
CPC .......... H01R 4/70; H01R 4/643; H02G 5/007
USPC ................. 174/68.1, 70 R, 71 B, 74 R, 75 R
See application file for complete search history.

(56) References Cited

FOREIGN PATENT DOCUMENTS

| | | |
|---|---|---|
| RU | 2439764 | 1/2012 |
| RU | 2518192 C2 | 6/2014 |
| RU | 147096 U1 | 10/2014 |

*Primary Examiner* — Tremesha S Willis
(74) *Attorney, Agent, or Firm* — Aleksandr Smushkovich

(57) ABSTRACT

A joint sleeve is proposed for connecting busbar sections, each having connectable contacts. In an embodiment, the sleeve includes—a non-magnetic case defining butt ends occluded with non-magnetic flanges each having a hole securing the respective busbar section therein,—a fire-resistant coating covering the case,—an electrically insulated supporting tube disposed within the case and defining a chamber therein, enclosing the connectable contacts,—a grounding screen mounted on the supporting tube, and—a fire-resistant layer disposed between the case and the screen capable of thermal expansion upon heating thereof, thereby improving fire-resistance. Instead of the fire-resistant layer, another embodiment includes an annular air chamber formed between the case and the supporting tube, while the annular chamber is in communication with hollows, and the supporting tube is closed by another pair of flanges with holes securing the respective busbar sections. The sleeve allows for improving fire-safety of power consuming facilities.

9 Claims, 3 Drawing Sheets

JOINT SLEEVE FOR HIGH TEMPERATURE INSULATED BUS PIPES

CROSS-REFERENCE TO RELATED APPLICATION

This U.S. patent application claims priority under 35 U.S.C. 119 (a) through (d) from a Russian patent application RU 2015133962 filed on 13 Aug. 2015, hereby entirely incorporated by reference.

FIELD OF THE INVENTION

The invention relates to means for transmitting electrical energy from power supplies to power consuming facilities, in particular, it relates to parts of power distribution systems such as joint sleeves for assembling busbar sections, specifically high temperature insulated bus pipes. The invention is to be used in the field of electrical engineering.

BACKGROUND OF THE INVENTION

There is known a busbar joint sleeve that includes a tubular case whose butt ends are closed with plates disposed outside the case. The plates have central openings, in which busbars are located, and the case has a chamber receiving contacts of the bars to be connected (Busbar joint sleeves, 35 kV phase-insulated busbar wireway, RAUTA-ENERGO).

There is known a transmission joint sleeve for electric cables that includes: an insulator made of an epoxy-based compound, the insulator fixed in a case made of a non-magnetic material, a plug-in connector, an additional insulator and a sealing assembly. The insulator is configured as a solid cast and is fixedly sealed to the case at one side thereof and slidably sealed to the case at the other side thereof. The insulator and the case are secured to each other by flange connections, wherein one of the connection contains a rubber gasket (RU147096U1, Oct. 20, 2014).

There is known a transmission joint sleeve for electric cables that includes: an insulator made of an epoxy-based compound, the insulator fixed in a case made of a non-magnetic material, a plug-in connector, an additional insulator and a sealing assembly, wherein the insulator is configured as a solid cast and is fixedly sealed to the case at one side thereof and slidably sealed to the case at the other side thereof. The insulator and the case are secured to each other by flange connections, wherein one of the connection contains a rubber gasket (RU2518192C2, Jun. 10, 2014).

There is known a device for coupling a high voltage electric cable having a paper insulator impregnated by an insulation fluid with a high voltage electric cable having a polymer insulator; the device includes a terminal sleeve disposed at the end of the paper-insulated electric cable, the terminal sleeve having a sealed busbar hinge insulator, wherein the joint area of the two high voltage electric cables is covered with an electric screen member and a case of the sleeve. The case is configured as an elongated integral part made of an elastic insulation material, the part having a through passage receiving the two high voltage electric cables. The case of the sleeve is equipped with electric adjustment funnels at its two axial ends, configured to receive the high voltage electric cables, wherein the funnels adjoin the conductive layers of the two high voltage electric cables when in the assembled position. The inner diameters of the through passage of the sleeve case at its two axial ends are configured to receive the high voltage electric cables and equipped with the adjustment funnels are strictly different according to the outer diameters of the high voltage electric cables, which outer diameters are different by at least 10 mm at the area of contacting the sleeve case (RU2009139673A, May 10, 2011).

There is known a joint sleeve for a busbar that includes: bearing bars located within insulation material of sidewalls which extend in parallel and define a receiving passage. A protective wire is preferably provided at the base of the busbar, while the protective wire is accessible from the receiving passage's side. The joint sleeve is substantially symmetrical relative to the middle cross-section plane thereof and includes contacts for connecting the bars of the busbar and mechanical guide parts and abutment parts of the joint sleeve which are configured to be inserted into the butt end of the busbar, thus providing limitation of the stroke thereof. The sleeve is characterized in that the contacts are provided in the form of L-shaped contact strips located correspondingly and configured to be spring-shifted within a region of the joint sleeve case across the longitudinal axis thereof. The contact strip has one side-projecting contact area located at one side of the middle abutment wall of the case and another side-projecting contact area located at the other side of the middle abutment wall which defines the middle cross-section plane or coincides with the same. The contact areas are located on the first L-shaped shoulder, wherein the side edge of the second shoulder of the contact strip adjoin the wall of the case made of an insulation material via a flat strap. The contact strips are made of a spring material and contain a slightly V-shape curved spring formed and orthogonally bent off the strip. The spring has a middle part with arms which ends are spring-loaded and adjoin the outer surface of the second shoulder of the contact strip, the surface being opposite to the projecting contact areas of the first shoulder (RU2013113959A, Oct. 10, 2014).

Patent documents also disclose joint sleeves including a case and electric contacts disposed therein (CN101465529A, Jun. 24, 2009; CN20135575Y, Dec. 2, 2009; JP2036717A, Feb. 6, 1990; U.S. Pat. No. 5,436,797; and JP2010110186).

The related art closest to the claimed joint sleeve is a known busbar joint sleeve, wherein the sleeve includes a hollow cylinder case made of a fiberglass plastic, the case having an electric contact secured to the wall in the central part thereof, the contact having outer and inner wires for equalization of electric field, wherein ring-shaped flanges made of aluminum are attached to the ends of the case, the flanges disposed at the outer surface of the case and connected to semi-rings having cradles engaging the current distributor sections. The outer surface of the case bears a layer of insulation paper on which a loop of the outer wire for equalization of electric field is positioned. A first copper foil layer is disposed on and soldered to the outer wire. A first aluminum copper foil layer is disposed over the copper foil layer and it presses the copper foil against the case. Some layers of insulation paper are wrapped over the first aluminum copper foil layer, while some layers of conductive paper are disposed between those insulation paper layers.

A second aluminum copper foil layer is disposed over the outer conductive paper layer along the whole length of the sleeve. A second copper foil layer is wrapped over the second aluminum copper foil layer along the whole length of the sleeve. An insulation paper layer is disposed over the second copper foil layer and a flexible heat-shrink tube is placed thereon, wherein the ends of the tube are placed on the sleeve flanges in an overlap manner and sealed. Two layers of a heat-shrink polyether jacketing tape is wound over the heat-shrink tube in an overlap manner. Threaded holes are disposed in each flange, the holes adapted for providing vacuum in between the sleeve case and the heat-shrink tube and for allowing pumping epoxy resin into the insulation layers of the sleeve. All those layers and gaps between the layers and the heat-shrink tube are filled with cured epoxy resin and all those layers are disposed along the length of the sleeve between the flanges thereof. A protective aluminum or steel tube is placed over the heat-shrink tube and protective silicon caps are provided at the ends of the protective tube. The caps are equipped with clamps for connecting the protective tube to the busbar sections. The inner wire of the contact is placed within the chamber of the sleeve case in order to connect the contact to the conductive bar of the busbar, whereas the outer wire is placed outside the sleeve case and is pressed thereto by the layers of the sleeve (RU2439764C1, Jan. 10, 2012, the closest prior art).

The common features of the known sleeve and the two embodiments of the claimed sleeve are as follows. Each of the sleeves includes a tubular metal case including an insulated supporting tube made of paper impregnated with cured epoxy resin. A grounding screen is disposed inside the metal case and is secured to the supporting tube and wraps around it. The butt ends of the metal case are occluded with flanges each having a central hole for a busbar disposed therein. The case and the flanges are made of a non-magnetic metal material (RU2439764C1, Jan. 10, 2012).

BRIEF SUMMARY OF INVENTION

It was proved in practice that the known joint sleeves manufactured according to Patent RU2439764C1 are durable and fire resistant within some limits of thermal load, however the known joint sleeves do not comply adequately with new requirements of safety and reliability applicable to power consuming facilities in hazardous environments. This is due to poor fire resistance of the joint sleeves under long thermal exposure including exposure to direct flame. The advantageous effect of the invention is improved fire resistance of the joint sleeve.

The advantageous effect is attained in a first inventive embodiment of a joint sleeve for coupling busbar sections, particularly high temperature insulated bus pipes (herein also called HTIBP).

According to the first embodiment, the joint sleeve comprises a case (made of non-magnetic metal, and preferably having a tubular shape); the case defines but ends thereof, and the case is covered with an outer fire-resistant coating; the case encloses an electrically insulated supporting tube defining a chamber therein; the chamber contains connectable contacts of the busbar sections; wherein the supporting tube is preferably made of paper impregnated with a binder.

The joint sleeve comprises a grounding screen disposed within the case; the grounding screen wraps around the supporting tube and is secured thereto. The butt ends of the case are occluded with flanges each having a central hole for securing the respective busbar section therein, while the flanges are disposed inside the case. The case and the flanges are made of non-magnetic metal.

The joint sleeve comprises a composite fire-resistant layer disposed between the case and the grounding screen; the fire-resistant layer is made of a filler capable of thermal expansion (herein also called 'swelling') upon heating, wherein the filler is impregnated with a binder. The filler and the binder operatively form cavities in the fire-resistant layer during the thermal expansion, wherein the outer surface of the fire-resistant layer adjoins the inner surface of the case, and the inner surface of the fire-resistant layer adjoins the grounding screen of the supporting tube.

Epoxy resin combined with a curing agent is used as the binder, and thermally expandable graphite is used as the filler. Powder graphite may be used as the filler. The powder thermally expandable graphite may be retained on a substrate impregnated with epoxy resin, thus providing a predetermined (e.g. tubular) shape of the fire-resistant layer. The case's wall contains a valve disposed near its flange, wherein the valve provides for fluid communication of the chamber with the atmosphere.

The advantageous effect is attained in the second inventive embodiment of a joint sleeve for coupling busbar sections. According to the second embodiment; the joint sleeve comprises a case (made of non-magnetic material, and preferably having a tubular shape); the case defines butt ends thereof, and the case is covered with an outer fire-resistant coating; the case encloses an electrically insulated supporting tube defining a chamber therein; the chamber contains connectable contacts of the busbar sections. The supporting tube is preferably made of paper impregnated with a binder.

The joint sleeve comprises a grounding screen disposed within the case; the grounding screen wraps around the supporting tube and is secured thereto. The butt ends of the case are occluded with case flanges each having a central hole receiving the respective busbar section, while the case flanges are disposed inside the case. The case and the case flanges are made of non-magnetic metal.

The joint sleeve comprises an annular air chamber (herein also called "annular gap") provided between the case and the grounding screen. The tube butt ends of the supporting tube are hermetically occluded with supporting tube flanges each having a hole receiving the respective busbar section.

The case's wall contains a valve disposed near its flange, wherein the valve provides for fluid communication of the annular air chamber with the atmosphere.

DETAILED DESCRIPTION OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

Figure 1:
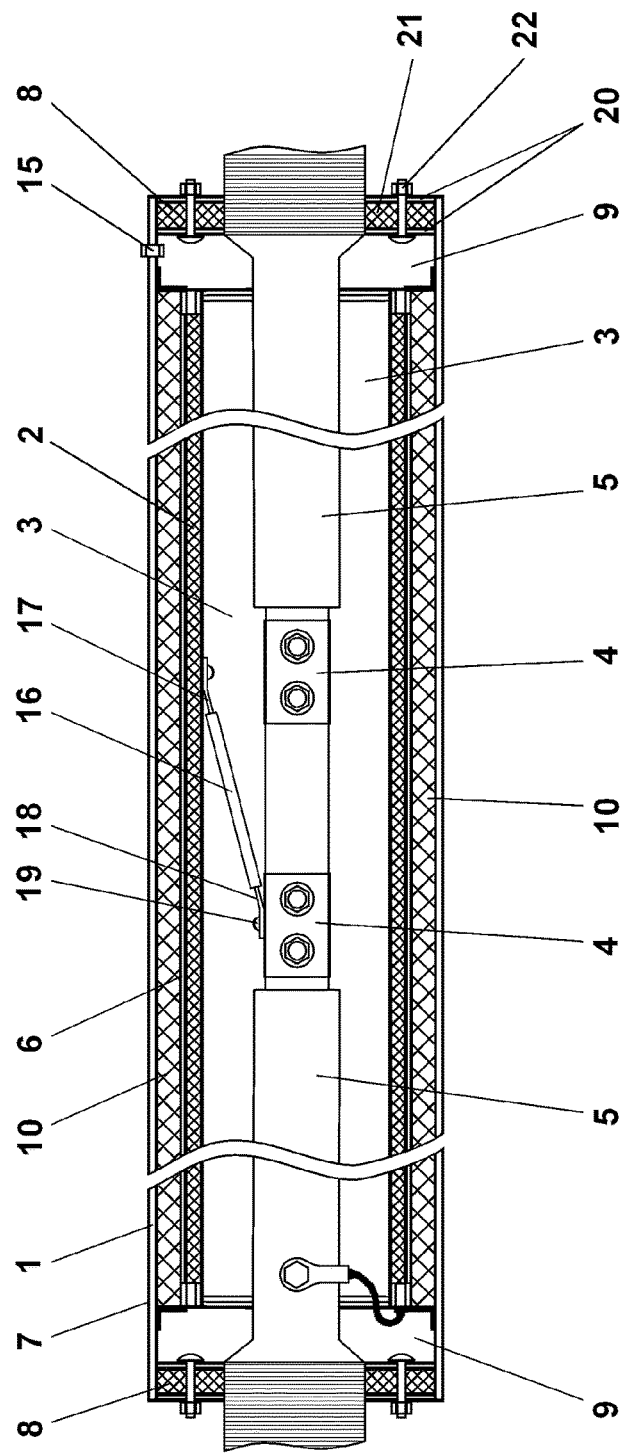
FIG. 1 shows a longitudinal sectional view of the first inventive embodiment of the joint sleeve.

According to the first inventive embodiment of a joint sleeve (FIG. 1) for coupling at least two busbar sections (particularly, HTIBP) of a busbar, the joint sleeve comprises a case 1, defining butt ends, end hollows 9 adjacent with the butt ends; the case 1 encloses an electrically insulated supporting tube 2 containing a chamber 3 inside thereof. The chamber 3 encloses contacts 4 of busbar sections 5. The supporting tube 2 is made of paper impregnated with a binder.

The joint sleeve comprises a grounding screen 6 affixed to the outside surface of the supporting tube 2. The supporting tube 2 is disposed within the case 1. The case 1 is outwardly covered with a fire-resistant coating 7. The butt ends of the case are occluded with flanges 8 each having a central hole. The respective busbar section is disposed in the central hole of each flange 8. The butt ends of the supporting tube 2 are rigidly secured to the case 1 preferably by means of angled members. The flanges 8 are disposed in the hollows 9 flush with the butt ends of the case 1. The case and the flanges are made of non-magnetic metal.

Figure 2:
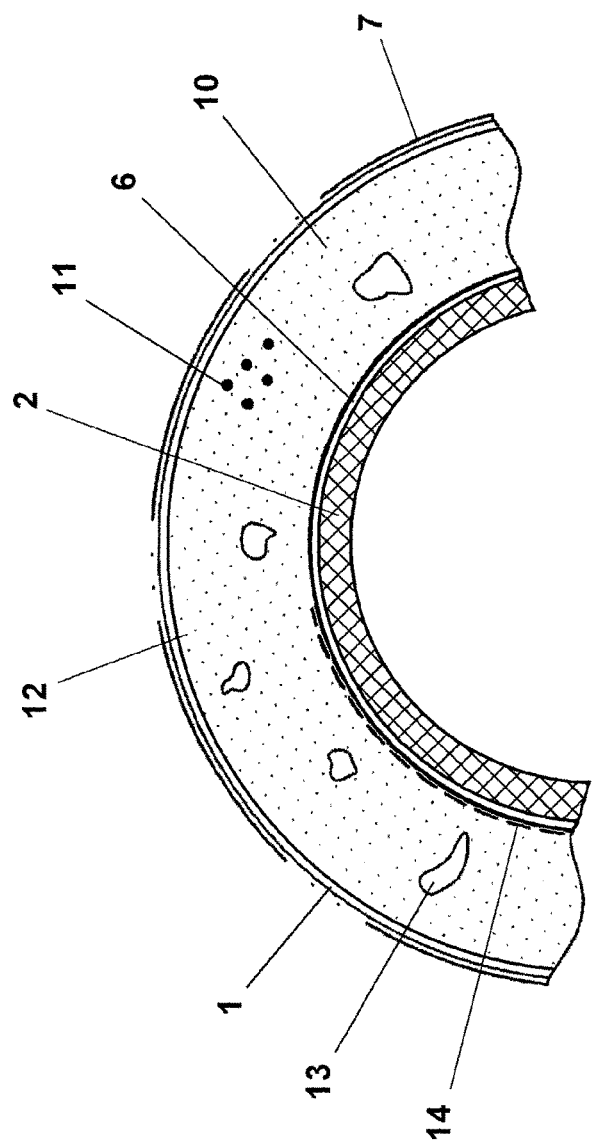
FIG. 2 shows a partial transversal section of the first inventive embodiment of the joint sleeve.

The joint sleeve comprises a composite fire-resistant layer 10 disposed between the case 1 and the grounding screen 6, wherein the cross-section of the fire-resistant layer 10 is provided in an annularly closed form. The layer 10 is made of particles 11 of a filler impregnated with a cured binder 12 (FIG. 2), which particles swell (thermally expand) upon heating. The filler particles 11 disposed within the cured binder 12 are configured to swell up and form cavities 13 in the fire-resistant layer 10 when the joint sleeve and correspondingly the fire-resistant layer 10 are exposed to excess heating.

The outer surface of the fire-resistant layer 10 is adjacent to the inner surface of the case 1, while the inner surface of the fire-resistant layer 10 is adjacent to the outer surface of the grounding screen 6.

A combination of epoxy resin with a curing (volcanizing) agent is used as the binder, and thermally expandable graphite is used as the filler. According to one option, the filler is provided in the form of powder graphite mixed with the binder in an initial state; according to another option, the powder graphite may be affixed to a substrate 14 impregnated with epoxy resin, so as the tubular fire-resistant layer 10 is formed by the substrate 14, the binder, and the powder graphite.

A pneumatic valve 15 is mounted in the case wall near one of the flanges 8. The valve 15 provides communication of the chamber 3 with the atmosphere and assures discharge of hot air from the chamber 3 to the atmosphere upon rising pressure in the chamber 3. In the opposite direction, the valve 15 lets air to enter the chamber 3 but prevents moisture from entering therein.

An outer wire 16 is disposed within the chamber 3, wherein one end 17 of the wire 16 is connected to the supporting tube 2, while the other end 18 of the wire 16 is equipped with a means 19 for connecting the contact 4 of the busbar section 5. Each of the flanges 8 consists of a pair of plates 20 and a fire-proof insulator 21 tightened together by screws 22.

The thickness of the fire-resistant layer 10 is preferably in the range of 3 to 25 mm and is selected depending on the cross-section area of the busbar section, configuration thereof, and the heat dissipation conditions. The composite material of the fire-resistant layer 10 includes, for example, epoxy resin combined with a curing agent as the binder, and thermally expandable graphite as the filler, wherein the composition includes 5 to 60 wt % of the thermally expandable graphite, and epoxy resin combined with the curing agent up to the balance. The thermally expandable graphite particles typically have dimensions of 0.5 to 0.8 mm and are provided in the form of a loose powder or in the form of powder affixed to the substrate 14 beforehand.

Figure 3:
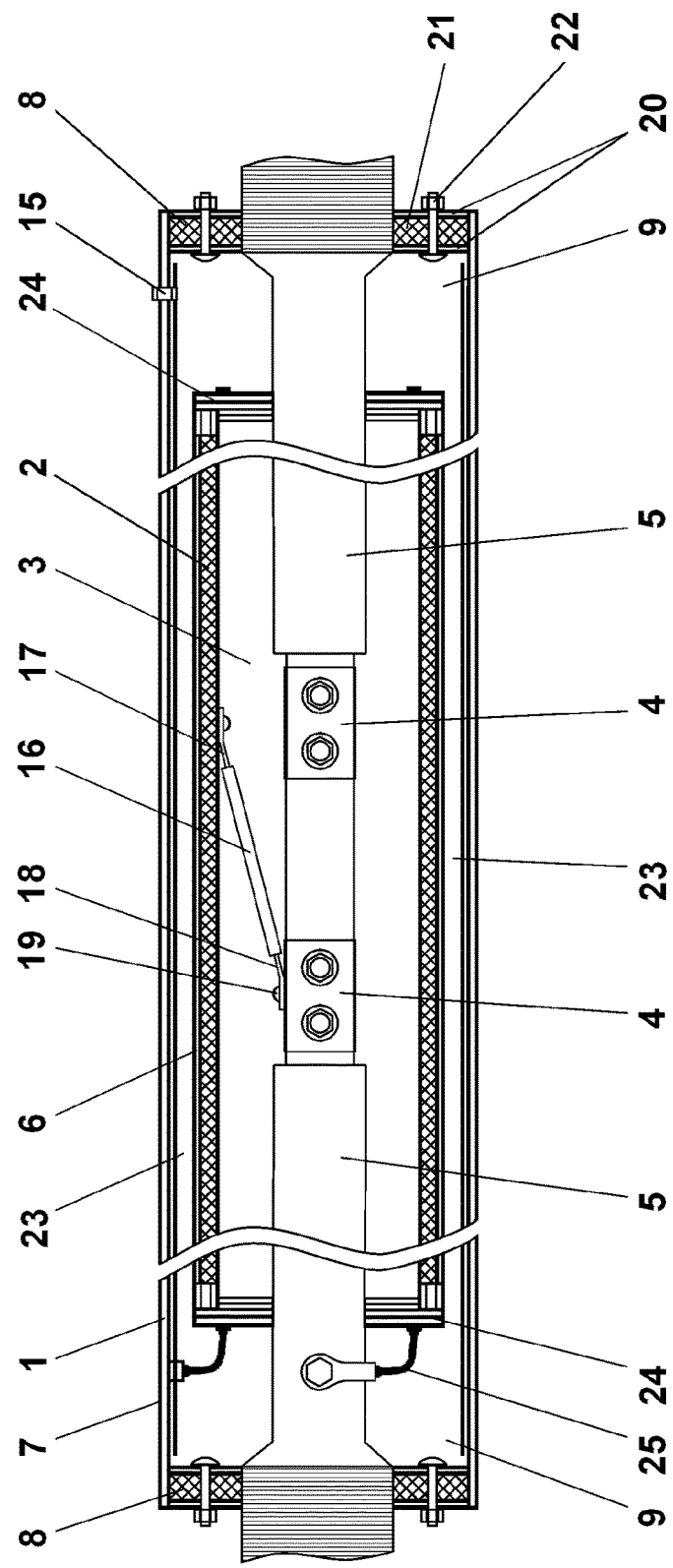
FIG. 3 shows a longitudinal sectional view of the second inventive embodiment of the joint sleeve.

According to the second inventive embodiment of a joint sleeve (FIG. 3) for coupling at least two busbar sections (particularly, HTIBP) of a busbar, the joint sleeve comprises a case 1, defining case butt ends, and at least two ending hollows 9 adjacent with the case butt ends. The case butt ends are occluded with case flanges 8 each having a central hole.

The case 1 encloses an electrically insulated supporting tube 2 defining a chamber 3 inside thereof. The chamber 3 encloses contacts 4 of busbar sections 5. The supporting tube 2 defines tube butt ends occluded with tube flanges 24. The supporting tube 2 is preferably made of paper impregnated with the binder.

The joint sleeve comprises a grounding screen 6 affixed to the outside surface of the supporting tube 2. The grounding screen 6 is disposed within the case 1. The case 1 is outwardly covered with a fire-resistant coating 7.

The respective busbar section is disposed in the central hole of each case flange 8. The case flanges 8 are disposed in the hollows 9, formed inside the case 1, in a flush manner relative the case butt ends. The case 1 and the case flanges 8 are made of non-magnetic material.

The joint sleeve comprises an annular chamber 23 (gap) formed between the case 1 and the supporting tube 2. The chamber 23 is in fluid communication with the hollows 9 each of which is defined by the case flanges 8 and tube flanges 24, as described above. The tube flanges 24 are parts of the supporting tube 2; they match and seal the tube butt ends of the supporting tube 2, and are rigidly secured thereto. Each tube flange 24 has a central hole, in which the respective busbar section is located and sealed. One of the tube flanges 24 is connected to a grounding shield of the busbar section 5 by means of an inner wire 25.

A valve 15 is mounted in the wall of the case 1 near the flange 8 thereof. The valve 15 provides for fluid communication of the annular chamber 23 and the hollows 9 with the atmosphere. An outer wire 16 is disposed within the chamber 3 of the supporting tube 2, wherein one end 17 of the wire 16 is connected to the supporting tube 2, while the other end 18 of the wire 16 is equipped with a means 19 for connecting to the contact 4 of the busbar section 5. Each of the case flanges 8 consists of a pair of plates 20 tightened together by screws 22 and a fire-proof insulator 21 placed between the plates 20.

The first embodiment of the sleeve (FIG. 1) operates as follows. Electric current flows through the busbar section 5. When in an emergency situation e.g. in fire, the metal case 1 having the fire-resistant coating 7 protects the supporting tube 2 and the busbar section 5 against a temperature load in predetermined limits. The heated metal case 1 transfers the heat via the fire-resistant layer 10 and the supporting tube 2 to the air chamber 3. The heat further is distributed over the air hollows 9 and is drained out via the busbar section 5.

When an extreme temperature load occurs, the particles 11 of the fire-resistant layer 10 swell up so as to form cavities 13 in the fire-resistant layer 10, which cavities reduce the heat transfer from the case 1 through the layer 10 to the supporting tube 2 and the busbar section 5. When air pressure in the air chambers 3 and hollows 9 is over an acceptable level, the valve 15 opens and the excess air pressure is released into the atmosphere. The flanges 8 of the joint sleeve, in particular, the fire-proof insulators 21 of the flanges 8, reduce the heat transfer from the butt ends of the case 1 into the chamber 3 so as to protect the supporting tube 2 and the busbar section 5 against the heat impact.

When the joint sleeve is heated from the outside, the joint sleeve protects the supporting tube 2, the busbar section 5, and the contacts 4 thereof against a temperature load in predetermined limits. It was discovered that, when the joint sleeve was heated up to 1000° C. from outside, including exposing the busbar section to direct flame, the busbar sections and the entire joint sleeve remained functional for 180 minutes.

In comparison with the heat impact durability of the known devices manufactured according to the closest prior art, this performance turn out to be 900% higher. The performance of the first embodiment of the joint sleeve was attained at an optimal thickness $t_0=13.5$ mm of the fire-resistant layer 10. If the thickness of the fire-resistant layer 10 is maximal, material usage is substantially increased; if the thickness is below a minimal value, the fire resistance of the joint sleeve is sharply decreased. Using a special fire-proof film substrate 14 in the fire-resistant layer 10 enables reducing the laboriousness during production of the joint sleeve.

Herein, the fire resistance of the joint sleeve means a resistance of the joint sleeve to the temperature load and ability to maintain its operability for a predetermined time between the start of external excessive heating and an eventual interruption of normal operation of the joint sleeve, after which the external heating is over. Practically, this time is defined by the safety requirements of power consuming facilities, e.g. elevators, to be operational in fire and other facilities closely related to human safety. The claimed joint sleeve possesses an improved fire resistance in comparison with the sleeves manufactured according to the above-indicated closest prior art and available on the market.

The second embodiment of the sleeve (FIG. 3) operates the same way as the first embodiment, except for the fire-resistant layer 10 is absent in the second embodiment. In the second embodiment of the sleeve, the metal case 1 having the fire-resistant coating 7, the annular chamber 23, the hollows 9, the chamber 3, flanges 8, and flanges 24 separating the hollows 9 and the chamber 23 from the chamber 3 provide the protective function.

When the joint sleeve is heated from the outside, the heat transfer is hampered by the chambers 23 and hollows 9, the flanges 8 and 24, and the chamber 3. When air pressure in the air chambers 23 and hollows 9 is over a predetermined level, the valve 15 opens and hot air is released into the atmosphere.

The second embodiment of the joint sleeve is advantageous comparable to the first embodiment due to a simplified method for manufacturing of the second embodiment. This embodiment of the joint sleeve assures normal operation thereof for a predetermined time, and its heat impact durability is 900% higher comparable to the same of the known sleeve, while the heat resistance performance depends on the volume of the air chambers.

The invention claimed is:

1. A joint sleeve for connecting at least two busbar sections, each having connectable contacts;
   said joint sleeve comprising:
   a case defining butt ends, wherein each said butt end is occluded with a flange disposed inside the case, and each said flange has a hole for securing the respective busbar section therein, wherein the case and the flanges are made of non-magnetic metal;
   an outer fire-resistant coating outwardly covering the case;
   an electrically insulated supporting tube disposed within the case, said supporting tube defines a chamber therein; the chamber encloses said connectable contacts;
   a grounding screen disposed within the case, said grounding screen wraps around the supporting tube and is secured thereto; and
   a composite fire-resistant layer disposed between the case and the grounding screen adjoining respective surfaces thereof; said composite fire-resistant layer includes a filler capable of thermal expansion upon heating; and said filler is impregnated with a binder such that the filler and the binder form cavities during said thermal expansion.

2. The joint sleeve of claim 1, wherein said binder is epoxy resin combined with a curing agent, and the filler is thermally expandable graphite.

3. The joint sleeve of claim 2, wherein said thermally expandable graphite is provided in the form of powder.

4. The joint sleeve of claim 3, wherein the powder of said thermally expandable graphite is retained on a substrate impregnated with epoxy resin thus providing for a predetermined shape of the composite fire-resistant layer.

5. The joint sleeve of claim 1, wherein said case further defines a wall; said case defines hollows each adjacent with the respective butt end and being in fluid communication with the chamber; said joint sleeve further comprises a valve mounted on the wall and disposed in predetermined proximity to one of said flanges; the valve is in fluid communication with one of said hollows; wherein said valve operatively provides for fluid communication of said chamber with the atmosphere.

6. The joint sleeve of claim 1, wherein said electrically insulated supporting tube is made of paper impregnated with the binder.

7. A joint sleeve for connecting at least two busbar sections, each having connectable contacts;
   said joint sleeve comprising:
   a case defining case butt ends, wherein each said case butt end is occluded with a case flange disposed inside the case, and each said case flange has a hole securing the respective busbar section therein, wherein the case and the case flanges are made of non-magnetic material; said case defines hollows each adjacent with the respective case butt end;
   an outer fire-resistant coating outwardly covering the case;
   an electrically insulated supporting tube disposed within the case, said supporting tube defines a chamber therein enclosing said connectable contacts; said supporting tube defines tube butt ends each occluded with a tube flange having a hole securing the respective busbar section therein;
   a grounding screen mounted on the supporting tube; and
   an annular air chamber formed between the case and the supporting tube, wherein said annular air chamber is in fluid communication with the hollows.

8. The joint sleeve of claim 7, wherein said case further defines a wall; said joint sleeve further comprises a valve mounted on the wall and disposed in predetermined proximity to one of said case flanges; the valve is in fluid communication with the corresponding hollow; wherein said valve operatively provides for fluid communication of said annular air chamber with the atmosphere.

9. The joint sleeve of claim 7, wherein said electrically insulated supporting tube is made of paper impregnated with a binder.

* * * * *